UNITED STATES PATENT OFFICE.

SAMUEL P. ETTER, OF EAST LAKE, ALABAMA.

PROCESS OF PRODUCING PHOSPHORIC IRON OR STEEL.

SPECIFICATION forming part of Letters Patent No. 639,368, dated December 19, 1899.

Application filed February 21, 1899. Serial No. 706,377. (No specimens.)

*To all whom it may concern:*

Be it known that I, SAMUEL P. ETTER, a citizen of the United States, residing at East Lake, in the State of Alabama, have invented certain new and useful Improvements in the Process of Producing Phosphoric Iron or Steel; and I do declare the following to be a full, clear, and exact description of the invention, such as will enable others skilled in the art to which it appertains to make and use the same.

This invention relates to a process for producing phosphoric iron or steel in the blast-furnace, whereby the evil effect of the presence of phosphorus in the resulting iron or steel is counteracted or neutralized; and it consists, essentially, in mixing ground and crushed coke and iron ore with varying quantities of dihydrate of aluminium and iron or bauxite and subjecting to the process of reduction in the blast-furnace and the addition from time to time, as may be necessary, of such quantities of bauxite as, together with the quantity already added, shall be such an amount as will provide aluminium not to exceed three per cent. of the iron contained in the ore. The best results are obtained from this process by the use of the dihydrate of aluminium and iron found in Georgia and Alabama.

I have found that the iron or steel obtained as a result of this process, although containing a high per cent. of phosphorus, is wholly unlike pig-iron, in that it is hard, very tough and ductile, and has none of the evil effects of the presence of phosphorus.

The manner of carrying out this process is as follows: Crushed ore and coke are thoroughly mixed with a sufficient quantity of dihydrate of aluminium and iron to provide aluminium in such quantity as will be equal to not more than three per cent. of the iron contained in the ore placed in the blast-furnace, and subject to the smelting process. If after a test of the reduced metal it should be found that the phosphorus is not all neutralized, a slight additional quantity of the powdered bauxite may be added to the top of the charge in the blast-furnace during the operation of smelting. The action of bauxite or aluminium clays in about the above quantities when mixed with the ground and crushed ore and coke and smelted appears to form a compound with the phosphorus contained in the iron ores whose presence in the resulting pig-iron or steel has none of the undesirable characteristics of phosphorus. In other words, the effect of the phosphorus present is neutralized. What this compound is I am unable to state, but that such compound does exist is manifest from the quality of the metal resulting therefrom.

This process is also used for the purpose of producing a cast-steel of varying grades when the ore containing both phosphorus and carbon is smelted therewith, wherein a large part of the carbon is removed from the metal and the effects of the phosphorus therein neutralized by the formation of the phosphoric compound above referred to. In the above process it is to be observed that the phosphorus in the iron ore is neutralized and the carbon eliminated from the ores before the metal is reduced therefrom.

Iron or steel of the character above described—*i. e.*, containing a neutralized compound of phosphorus—may be produced by smelting together the crude ores of iron and about the above-mentioned quantities of aluminium clays. I therefore do not care to limit myself to any particular one of the aluminium clays; but,

Having thus described my invention, what I claim is—

The herein-described process of producing phosphoric iron and steel, consisting of smelting a mixture of iron ore, coke and bauxite, and second, injecting from time to time into the furnace upon the top of the charge powdered bauxite in such quantities that the aggregate amount of aluminium used will be not greater than three per cent. by weight of the iron contained in the ore for the purpose of neutralizing the effects of phosphorus.

In testimony whereof I affix my signature in presence of two witnesses.

SAMUEL P. ETTER.

Witnesses:
JOHN WHITE,
A. C. HOWZE.